United States Patent [19]

Gartner et al.

[11] Patent Number: 5,156,679
[45] Date of Patent: Oct. 20, 1992

[54] AIR-DETRAINER FOR HYDRAULIC CEMENT COMPOSITIONS

[75] Inventors: Ellis M. Gartner, Silver Spring, Md.; David F. Myers, Berkshire, England

[73] Assignee: W. R. Grace & Co.-Conn., New York, N.Y.

[21] Appl. No.: 718,051

[22] Filed: Aug. 12, 1991

[51] Int. Cl.$^5$ .............................................. C04B 25/12
[52] U.S. Cl. .................................... 106/808; 106/727; 106/823
[58] Field of Search ...................... 106/727, 808, 823

[56] References Cited

FOREIGN PATENT DOCUMENTS 02294383 2/1991 Japan .

OTHER PUBLICATIONS

Wilk, Kazimiera, "Exchange Type Reactions Between Oxiranes Orthirianes and 2-Hydroxyalkyl or 2-Thioalkylamines and Sulfides", Polish Journal of Chemistry, 62(7-12), pp. 895-898, Chem. Abstract No. CA 112 (17):157606F.

Primary Examiner—William R. Dixon, Jr.
Assistant Examiner—Anthony J. Green
Attorney, Agent, or Firm—Howard J. Troffkin

[57] ABSTRACT

A hydraulic cement admixture capable of air detrainment to structures formed therefrom comprising water-soluble alkylated alkanolamine salts.

17 Claims, 1 Drawing Sheet

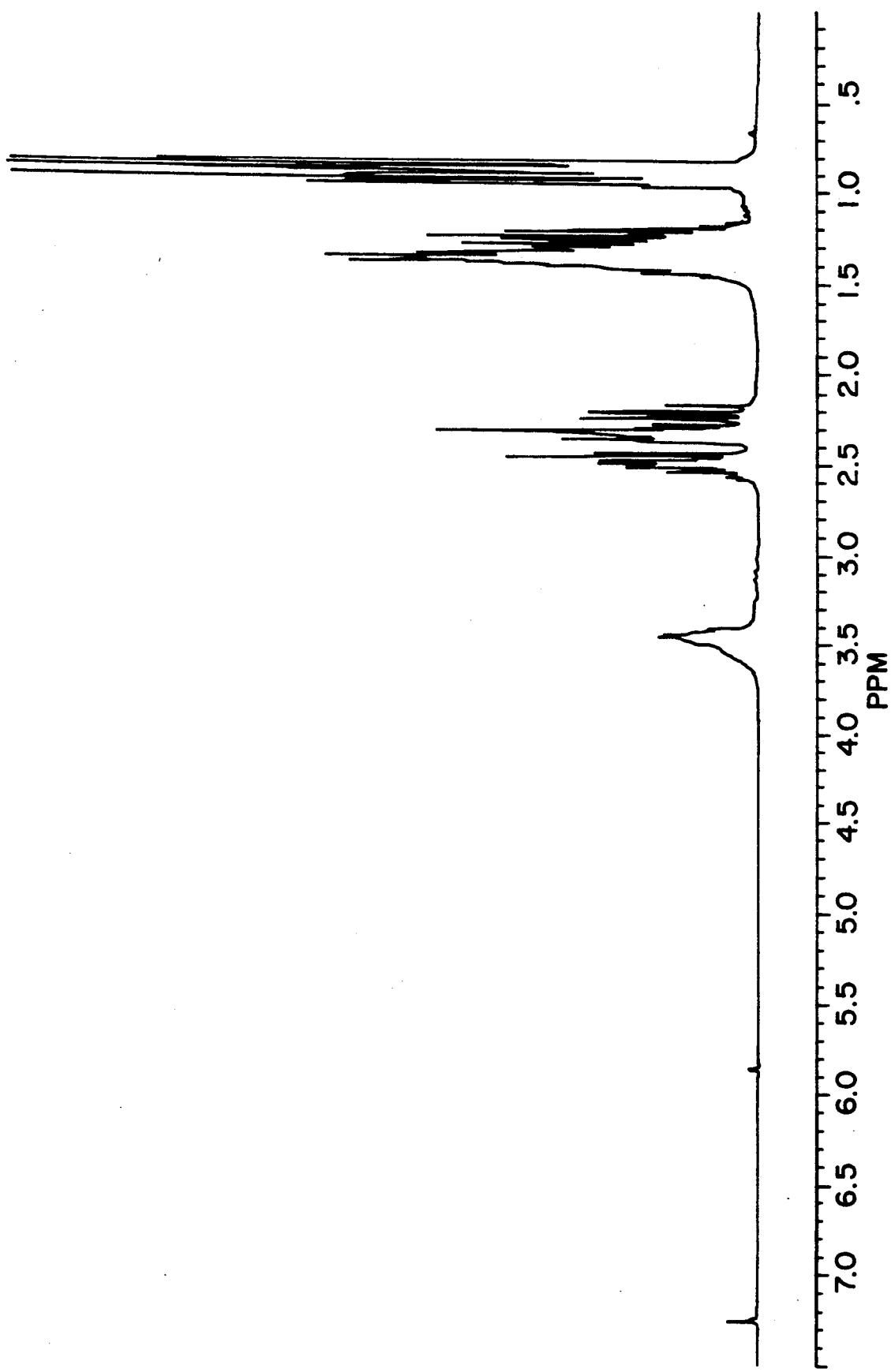

AIR-DETRAINER FOR HYDRAULIC CEMENT COMPOSITIONS

BACKGROUND OF THE INVENTION

The present invention is directed to certain alkylated alkanolamines as a hydraulic cement admixture and to cement compositions containing same. Specifically, alkylated alkanolamines described herein have been found capable of lowering the air content and related porosity of cement compositions.

The term cement is used to designate many different kinds of materials useful as binders or adhesives. Hydraulic cements are powdered inorganic materials which, when mixed with water, form a "paste" that hardens slowly. If further mixed with fine aggregate (e.g. sand), it forms a "mortar" and if mixed with both fine and coarse aggregate (e.g. sand and stone) it forms a "concrete" which are rock-hard products useful in structural formations. These products are commonly referred to as hydraulic cement compositions or mixes. These compositions are commonly formed from portland cements (conforms to ASTM C-150), blended cements (containing large amounts of slag or pozzolanic materials, etc.) and the like.

Various additives have been used in hydraulic cement compositions to alter mixing and curing properties and conditions as well as to alter the properties of the resultant cured product of the hydraulic cement composition.

When concrete is formed, it requires mixing of the various components (hydraulic cement, sand, gravel, water and possibly cement additives) to a substantially uniform mixture. In the course of the mixing, air becomes entrapped in the composition and much of this air remains in the resultant cured hydraulic cement composition in the form of voids. If the amount of voids is large, the mix is said to be "air entrained". In most instances, a small amount of air entrainment is tolerated and, in certain instances, it is desired (to enhance the freeze/thaw properties of the concrete). However, in warmer climates, air entrainment in the hydraulic cement composition is not a desirable feature as it causes the resultant structure to have lower compressive strength than the mixture design is capable of attaining. There is an inverse relationship between air entrainment and compressive strength. It is generally believed that for each 1 volume percent of air bubbles contained in a concrete mass, the concrete mass loses about 5 percent of its compressive strength.

It is known that certain cement admixtures used for their beneficial effects also have a detrimental side effect of causing excessive air entrainment. Such cement additives include certain water-reducing agents and superplasticizers such as lignin sulfonates, naphthalene sulfonate polymers and the like; strength enhancers and set accelerators such as triisopropanolamine triethanolamine, respectively, and the like. The reduction of entrained air, whether due to mixing technique, admixture effect or the like, is highly desired to provide a structure which closely approaches its design strength and which has low permeability and, therefore, is not susceptible to attack by corrosive elements and the like which could permeate into the structure during its useful life.

Various materials are presently used in the cement industry to reduce the amount of air contained in cured hydraulic cement compositions. Conventional air-detraining agents are generally viewed as surfactants having low hydrophilic-lipophilic balance (HLB) values, such as tri-n-butylphosphate, n-octanol and the like. Normally, these agents have been found difficult and somewhat ineffective to use in commercial applications for several reasons. Firstly, they can not be readily introduced into dry concrete mixes due to the difficulty in dispersing the additive throughout the cement to provide a uniform distribution of the small amount of agent required. Further, the conventional air detrainers are not miscible with and, therefore, not capable of being added with other conventional cement admixtures as such admixtures are invariably water-based compositions. When it is attempted to incorporate an air-detrainer into an aqueous admixture composition, it tends to separate out and is not properly supplied to the cement composition to be treated. Recently, "water-dispersible" air-detrainers have been introduced in an attempt to overcome this problem. These agents still have low HLB values and are actually not water soluble but merely have densities close to that of water. Nevertheless, these agents phase-segregate and are unstable in aqueous suspension in storage and, thus, have the same defects of prior known air-detrainers.

Air-detraining agents are generally very powerful in their effectiveness and, therefore, must be used in very small amounts which must be substantially uniformly distributed throughout the cement composition being treated. Presently known air-detraining agents have the disadvantages of being difficult to monitor and control in terms of dosage and distribution in cement compositions, thus causing the composition to exhibit unwanted variation from the desired degree of aeration (due to over or under dosage) and/or variation in aeration within the formed structure (due to poor distribution of agent).

It is highly desired to provide a water-soluble, readily dispersible material which is capable of providing air-detraining to cement compositions, in particular concretes.

SUMMARY OF THE INVENTION

The present invention provides a water soluble air-detraining admixture for hydraulic cement compositions. The subject admixture is composed of an aqueous solution having a pH of from about 6 to 8 of at least one N-alkylalkanolamine or N-alkyl hydroxylamine. The admixture, when mixed with the hydraulic cement composition causes a reduction in the air content of said composition.

DETAILED DESCRIPTION

The present invention is directed to a novel air-detrainer cement admixture, to improved hydraulic cement-based compositions containing said novel admixture.

The present invention is directed to the use of certain amines as air-detraining admixtures. The amines found useful herein are tertiary alkylated alkanolamines and secondary alkylated alkanolamines. These amines can be represented by the general formula

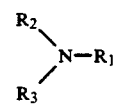

wherein $R_1$ represents a $C_2$-$C_5$ hydroxyalkyl group or hydrogen; $R_2$ represents a $C_2$-$C_5$ hydroxyalkyl group or a $C_2$-$C_8$ alkyl group provided that $R_2$ is a $C_2$-$C_5$ hydroxyalkyl group when $R_1$ is a hydrogen; and $R_3$ represents a $C_2$-$C_8$ alkyl group. The subject admixture is thus formed from tertiary amines having one or two $C_2$-$C_5$ hydroxyalkyl groups bonded to the nitrogen atom and the remaining bonds of the nitrogen contains $C_2$-$C_8$ alkyl group(s). Stated another way, the tertiary amines useful as the subject admixture are N,N-di(C$_2$-C$_8$ alkyl)amino-C$_2$-C$_5$ alkanol and N-(C$_2$-C$_8$ alkyl)amino-N,N-di(C$_2$-C$_5$ alkanol) compounds. Alternately, the subject admixture can be formed from secondary amines in which two bonds of the nitrogen substituted with a $C_2$-$C_8$ alkyl group and a $C_2$-$C_5$ hydroxyalky group.

The present cement air-detraining agent can be a tertiary amine selected from dialkyl alkanolamines and alkyldi(alkanol) amines. Examples of suitable N,N-dialkylalkanolamines are N,N-di(C$_2$-C$_8$ alkyl)ethanolamines such as diethyl ethanolamine, di(n-propyl)ethanolamine, di(n-butyl) ethanolamine and the like; N,N-di(C$_2$-C$_8$ alkyl)-1-amino-2-propanols such as di(n-propyl)isopropanolamine, di(n-butyl)isopropanolamine, di(n-octyl)isopropanolamine and the like; N,N-di(C$_2$-C$_8$ alkyl)-1-amino-2-hydroxybutane and N,N-di(C$_2$-C$_8$ alkyl)-1-hydroxy-2-aminobutane such as dibutyl-1-amino-2-butanol, di(n-pentyl)-1-amino-2-butanol and the like.

The present invention can also be composed of a secondary amine selected from alkylalkanolamines. Examples include ethyl isopropanolamine, N-ethyl-1-amino-2-hydroxybutane, N-butyl-1-amino-2-hydroxybutane and the like.

The subject admixture can also be formed from N-alkylated bis(alkanol)amines such as N-propyl-1-aminobis(2-propanol), N-butyldiethanolamine, N-octyl diethanolamine and the like.

The subject alkylated alkanolamines can be formed by the ring-opening reaction of an epoxide with a primary or secondary amine. The reaction is conventionally conducted at elevated temperatures of from about 50° C. to about 200° C. under pressures ranging from 0.2 to 4MPa (2 to 40 bar) in the presence of water to accelerate the reaction rate. When a primary amine is utilized, one obtains both the secondary and the tertiary N-alkylated products, while a secondary amine reactant provides the N,N-dialkylated tertiary amine product. Several of these materials are commercially available.

The preferred amines are the tertiary amines described herein above. The subject admixture can be formed from a mixture of the secondary and tertiary amines described above.

It has been found that the novel compound, N,N-dibutyl-1-amino-2-butanol, provides a most preferred air-detrainer admixture of the present invention. This material is the product formed from the reaction of dibutylamine with 1,2-epoxybutane. Although it is generally believed that the epoxy compound must be added slowly to the amine to avoid a catastrophic exothermic reaction, it was presently observed that the two reactants can be added together in any manner provided the system is substantially anhydrous. The reaction occurs when water (from about 0.01 to 10 mole based on the molar amount of epoxy compound) is added to the mixture of reactants. The ring-opening reaction is carried out at elevated temperatures of from about 50° C. to 200° C. (preferably from about 90° C. to 170° C.) in the presence of water (from about 0.01 to 10 mole, preferably from about 1 to 10 mole, per mole of epoxy compound). The reaction can be readily conducted under reflux conditions. Where higher temperatures are used, the reaction must be conducted under sufficient pressure to maintain the mixture in a liquid state (preferably, autogenous pressure).

BRIEF DESCRIPTION OF THE DRAWING

A nuclear magnetic resonance spectrum of the novel N,N-dibutylamino-2-butanol compound, conducted in deuterated chloroform, is shown in the FIGURE.

The subject alkylated alkanolamine air-detraining agents are soluble in aqueous solutions when in the form of a substantially neutral salt. The solution will have a pH of from about 5 to 8, preferably 6 to 7. The salt of these agents are readily formed with an acid (HX) selected from inorganic acids such as sulfuric, nitric, or halogenic acids, and the like or from organic acids such as $C_1$-$C_5$ alkanoic acids, as for example formic, acetic, propionic, butyric acids and the like wherein H represents the acidic proton of the acid and X represents the remainder of the acid compounds. The preferred acids used to form the salt of the subject amines are sulfuric acid or the $C_1$-$C_2$ alkanoic acid.

The subject amine agents, as the free amine, are normally weak bases having slight solubility in water. The free amine normally has a pH of about 8-9. Aqueous solution/dispersion of the free amine are readily formed into solutions of the salt by introducing and mixing the acid, as described above, with the aqueous-free amine mixture. The concentration of amine salt within the solution can be from just a few percent (e.g. 2%) up to very high concentrations of 50 percent or even greater depending on the particular amine agent. These solutions can be directly used to store and transport the agent to the job site where it can be diluted and/or mixed with other agents to form the desired admixture.

The water-soluble alkylated alkanolamine salts are readily useable as a cement admixture and can be metered to a high degree to provide proper dosage to cement compositions as an air-detraining agent. Because of the high degree of a activity of air-detraining agents, the ability to accurately meter dosages is a highly desired requirement.

The subject water-soluble air detraining agents can be incorporated into a hydraulic cement or a paste, mortar or concrete hydraulic cement composition in conventional manners. For example, the subject agents can be readily interblended with the hydraulic cement as it is being formed from clinker and other raw materials to provide a dry blend of hydraulic cement capable of being used to form a low air entrained structure. Because of the low dosage requirement (the water content is therefore also small) and the low vapor pressures of these materials they can be readily incorporated in the cement directly. Alternately, solutions of the agent can be incorporated as part of the water of hydration. Because of the agent's water solubility, such an application can be readily done and does not present the incompatibility problems of presently known agents. Finally, the present agents can be incorporated into an aqueous admixture solution which provides other desired admixture agents to the cement compositions as, for example, water reducing agents such as lignin sulfonates, naphthalene sulfonate-formaldehyde condensates and the like; superplasticizers such as polyacrylates and the like; corrosion inhibitors, such as calcium nitrite and the like;

accelerators, such as alkali metal chlorides, alkali metal nitrites, lower trialkanolamines and the like; strength enhancers such as fumed silica, higher trialkanolamines and the like. Because many of the commercial admixtures impart, as a secondary property, air-entrainment to the treated cement composition, the present agent can be incorporated and admixed with such agents in amounts which counter this secondary property to thus provide an improved admixture.

It is common for an admixture to be furnished and used as an aqueous solution. Most admixture agents accepted in commercial application are applied as an aqueous solution and, therefore, the ability of the present agents to have high water-solubility and activity makes them easily handled and applicable in commercial applications. The subject agents are normally present in concentrations of from about 0.01% to about 10% in aqueous admixture solutions as the sole agent therein or as one of a combination of agents of the admixture composition. The subject air detrainers are normally applied to the cement or cement composition as a dilute admixture solution to provide a dosage of from about 0.0001 to 1%, preferably from 0.0001 to 0.1%, and most preferably from about 0.001 to 0.05% by weight of agent solids based on cement solid content (s/c). The exact dosage required will depend upon the particular agent the present air-detrainer is used with, the dosage of such agent and/or degree of detraining desired. The dosage can be determined by the artisan by conventional experimentation and testing. When the present air detrainer is used in combination with other admixture agents it is normally present in from 0.0001 to 10 parts, preferably from 0.002 to 0.2 part for each part of other admixture agent used.

The following examples are given for purposes of illustration and are not meant to be a limitation on the claims appended hereto. All parts and percentages are by weight unless otherwise stipulated. The examples used various commercial portland cements having an elemental analysis, as oxides, shown in Table I below.

TABLE I

| Cement | Elemental analysis as oxides, % by mass | | | | | | | | | | |
|---|---|---|---|---|---|---|---|---|---|---|---|
| | $Na_2O$ | $K_2O$ | MgO | CaO | $Al_2O_3$ | $Fe_2O_3$ | $SiO_2$ | $TiO_2$ | $SO_3$ | LOI | Total |
| A | 0.37 | 0.21 | 1.84 | 64.56 | 5.51 | 2.74 | 20.93 | 0.24 | 1.98 | 1.12 | 99.6 |
| B | <0.2 | 0.44 | 4.18 | 62.21 | 4.07 | 3.40 | 21.11 | 0.44 | — | 2.14 | 98.2 |
| C | 0.08 | 0.59 | 0.71 | 64.51 | 4.36 | 3.43 | 21.40 | 0.18 | 2.85 | 1.21 | 99.4 |
| D | 0.45 | 0.40 | 3.63 | 61.95 | 4.54 | 3.38 | 21.41 | 0.39 | 2.46 | — | 98.6 |

EXAMPLE I

Mortar mixes were prepared using two different hydraulic cements. The mortars were formed and tested for air content according to the procedures of ASTM C-185. In each instance, a mortar mix was formed which contained no admixture agent. To a portion of each mortar mix was added, as part of the water of hydration, 0.02% by weight of triisopropanolamine, a known strength enhancing admixture, based on the weight of the cement therein. To a second portion of each mix was added, as part of the water of hydration, the strength enhancing admixture with 0.01% by weight of dibutylamino-2-butanol (DBAB), as the acetate salt, added thereto. Several samples were prepared and tested according to ASTM C-185 and the results given below are the mean of each of the measured values.

The strength enhancer caused a significant increase in air entrainment which was reduced to below the level of the blank (overcame the air entrainment and further provided some extended air detrainment) in each instance. The results are shown in Table II below.

TABLE II

| Sample | Cement | Air Content, % Mean Value | % Change |
|---|---|---|---|
| blank | A | 7.1 | — |
| 0.02% TIPA | A | 8.7 | +22.5% |
| 0.02% TIPA + 0.01% DBAB | A | 6.0 | −15.5% |
| blank | B | 10.9 | — |
| 0.02% TIPA | B | 11.5 | +5.5% |
| 0.02% TIPA + 0.01% DBAB | B | 10.6 | −2.8% |

EXAMPLE II

The process of Example I was followed except that the cement admixture added to the mortar composition was a cement superplasticizer (high range water-reducing agent) composed of a polyethyleneoxide-polyacrylate graft copolymer. The results showed a significant decrease in air entrainment when the superplasticizer was used in combination with DBAB.

| Sample | Cement | Air Content, % Mean Value | % Change |
|---|---|---|---|
| Blank | C | 9.7 | — |
| 0.1% Superplasticizer | C | 12.7 | +30.9 |
| 0.1% + 0.01% DBAB | C | 11.0 | +13.4 |

EXAMPLE III

A test was performed in the same manner as described in Example I above except that the sand used was a graded sand having the following U.S. Standard sieve size distribution (pass through): No. 8/100%; No. 12/88.8%, No. 16/69.0%; No. 30/55.1%; No. 40/47.0%; No. 50/36.7%; No. 60/31.8; No. 80/27.5; No. 100/17.3; No. 140/5.43; and No. 200/0.9%. The use of such sand is known to provide a low air content mortar. The addition of the strength enhancer, triisopropanolamine, in 0.02% s/c (agent solid/cement solid) caused the air content to increase dramatically. When the admixture contained both 0.02% strength enhancer and 0.001% s/c of dibutylamino-2-butanol the air content was lowered to less than the blank standard.

TABLE III

| Sample | Mean Flow % | w/c | Mortar Air Content, % | | |
|---|---|---|---|---|---|
| | | | Test 1 | Test 2 | Mean |
| Blank | 86 | 0.48 | 3.0 | 2.9 | 3.0 |
| 0.02% TIPA | 91 | 0.48 | 5.5 | 5.4 | 5.5 |
| 0.02% TIPA[1] | 92 | 0.48 | 5.5 | 5.4 | 5.5 |
| 0.02% TIPA + 0.001% DBAB | 87 | 0.48 | 2.6 | 2.6 | 2.6 |
| 0.02% TIPA + | 93 | 0.48 | 3.2 | 3.2 | 3.2 |

TABLE III-continued

| Sample | Mean Flow % | w/c | Mortar Air Content, % | | |
|---|---|---|---|---|---|
| | | | Test 1 | Test 2 | Mean |
| 0.002% DBAB | | | | | |

[1]Repeat Test Conducted 24 hrs. after initial test

The results show that very small dosages are effective to control and reduce air content.

EXAMPLE IV

The procedure of Example I was repeated except that various air detraining agents representative of the present invention were used to reduce the air content of strength-enhanced admixture formulations. The results are shown in Table IV below.

TABLE IV

| Sample[1] | Mean Flow % | w/c | Air Content, % | | |
|---|---|---|---|---|---|
| | | | Test 1 | Test 2 | Mean |
| Blank | 84 | 0.48 | 2.93 | 3.02 | 2.98 |
| 0.02% TIPA | 91 | 0.48 | 5.44 | 5.47 | 5.46 |
| 0.02% TIPA + 0.004% DBAB[2] | 92 | 0.48 | 3.11 | 3.06 | 3.09 |
| 0.02% TIPA + 0.004% DBAE[2] | 92 | 0.48 | 3.45 | 3.50 | 3.48 |
| 0.02% TIPA + 0.004% DEAE[2] | 96 | 0.48 | 4.15 | 4.09 | 4.12 |
| 0.02% TIPA + 0.004% BDEA[2] | 93 | 0.48 | 3.62 | 3.73 | 3.68 |

[1]Cement D was used
[2]DBAE = dibutylaminoethanol; DEAE = diethylaminoethanol; BDEA = butyldiethanolamine; DBAB = dibutylamino-2-butanol

EXAMPLE V

Two concrete compositions were formed each from the following recipe of components: 3539 parts portland cement C, 9800 parts coarse aggregate, 7176 parts fine aggregate and 1543 parts water (w/c ratio of 0.435). In each instance, the mixing pattern was to first introduce the coarse and fine aggregate into the mixer (Lancaster Mixer, 0.75 ft³ capacity) followed, in 1 min., by the addition of the cement and at 1.75 min. the water was added. The mixing was continued until 7.75 minutes elapsed. A sample was then taken to measure slump and plastic air content. At 12.5 minutes, admixture was introduced. In one batch, the admixture was lignin sulfonate water reducer (a 33% aqueous sol. Reed SFX) at 0.2% s/c dosage. The second batch was treated with the same lignin sulfonate solution having DBAB (0.002% s/c dosage) as the acetate salt dissolved therein at a solids ratio (lignin/DBAB) of 100. Mixing was then continued for 2 minutes (to 14.5 minutes from start) and then again for about 6 min (20.25 min from start) with sampling for slump and air content at each point. The results in Table V show that the present air-detraining agents are readily mixed with aqueous admixture solutions to provide a reduced air content cement composition which still maintains the desired property (here, increased slump) of the original admixture.

TABLE V

| Time of Mix (min) | Admixture | | Properties | |
|---|---|---|---|---|
| | Lignin | Ligin + DBAB | Slump (in.) | Plastic Air (%) |
| 0 | — | — | — | — |
| 7.75 | — | — | 1.25 | 0.9 |
| 12.50 | admixture added | | | |
| 14.50 | x | | 6.75 | 6.5 |
| 14.50 | | x | 5.50 | 2.8 |
| 20.25 | x | | 5.25 | 4.6 |
| 20.25 | | x | 3.00 | 1.7 |

What is claimed:

1. A hydraulic cement composition capable of forming a low air entrained structure comprising a hydraulic cement having from 0.0001 to 1 percent by weight based on the cement of an amine salt represented by the formula:

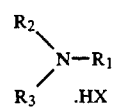

wherein $R_1$ represents a $C_2$-$C_5$ hydroxyalkyl group or hydrogen; $R_2$ represents a $C_2$-$C_5$ hydroxyalkyl or a $C_2$-$C_8$ alkyl group provided that when $R_1$ represents a hydrogen, $R_2$ represents a $C_2$-$C_5$ hydroxyalkyl group; $R_3$ represents a $C_2$-$C_8$ alkyl group; and HX represents an salt forming inorganic or organic acid.

2. The cement of claim 1 wherein the amine is an N,N-di($C_2$-$C_8$ alkyl)amino $C_2$-$C_5$ alkanol.

3. The cement of claim 1 wherein the a mine is a N-($C_2$-$C_8$ alkyl)amino-N,N-di($C_2$-$C_5$ alkanol).

4. The cement of claim 1 wherein the amine is an N-alkylaminoalkanol.

5. The cement of claim 2 wherein the amine is dibutyl-1-amino-2-butanol.

6. The cement of claim 1 where the amine is present in 0.001 to 0.05% by weight based on the cement.

7. An admixture for cement compositions comprising an aqueous solution having a pH of from about 6 to about 8 containing from about 0.01 to about 10 percent of an alkylated amine salt represented by the formula:

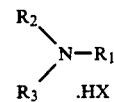

wherein $R_1$ represents a $C_2$-$C_5$ hydroxyalkyl group or a hydrogen; $R_2$ represents a $C_2$-$C_5$ hydroxyalky or a $C_2$-$C_8$ alkyl group provided that when $R_1$ represents a hydrogen, $R_2$ represents a $C_2$-$C_8$ alkyl group $R_3$ represents a $C_2$-$C_8$ alkyl group; and HX represents a salt forming inorganic or organic acid and at least one cement admixture agent selected from a cement water-reducing agent, superplasticizer, corrosion inhibitor, set accelerator or strength enhancer; said amine salt and at least one cement admixture agent are present in a ratio of from about 0.0001 to 10.

8. The admixture of claim 7 wherein the amine is an N,N-di($C_2$-$C_8$ alkyl)amino $C_2$-$C_5$ alkanol.

9. The admixture of claim 7 wherein the amine is a N-($2$-$C_8$ alkyl)amino-N,N-di ($C_2$-$C_5$ alkanol).

10. The admixture of claim 7 wherein the amine is an N-alkylaminoalkanol.

11. The admixture of claim 8 wherein the amine is dibutyl-1-amino-2-butanol.

12. An improved cured, hydraulic cement structure formed from a mixture of hydraulic cement, aggregate and sufficient water to hydrate the cement, the improvement comprising that said mixture contains an effective amount to reduce the air content of said structure of an alkylated amine represented by the formula:

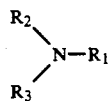

wherein $R_1$ represents a $C_2$–$C_5$ hydroxyalkyl group or a hydrogen; $R_2$ represents a $C_2$–$C_5$ hydroxyalkyl or a $C_2$–$C_8$ alkyl group provided that when $R_1$ represents a hydrogen, $R_2$ represents a $C_2$–$C_5$ hydroxyalkyl group; and $R_3$ represents a $C_2$–$C_8$ alkyl group.

13. The structure of claim 12 wherein the amine is an N,N-di($C_2$–$C_8$ alkyl)amino $C_2$–$C_5$ alkanol present in from about 0.0001% to 1 by weight based on the weight of cement contained in said cured, hydraulic cement structure.

14. The structure of claim 12 wherein the amine is a N-($C_2$–$C_8$ alkyl)amino-N,N-di($C_2$–$C_5$ alkanol) present in from about 0.0001% to 1 by weight based on the weight of cement contained in said cured, hydraulic cement structure.

15. The structure of claim 12 wherein the amine is an N-alkylaminoalkanol present in from about 0.0001% to 1 by weight based on the weight of cement contained in said cured, hydraulic cement structure.

16. The structure of claim 13 wherein the amine is dibutyl-1-amino-2-butanol present in from about 0.0001% to 1 by weight based on the weight of cement contained in said cured, hydraulic cement structure.

17. The structure of claims 12, 13, 14 or 15 wherein the amine is present in from about 0.001 to 0.05% by weight based on the weight of cement contained in said cured, hydraulic cement structure.

* * * * *

UNITED STATES PATENT AND TRADEMARK OFFICE
CERTIFICATE OF CORRECTION

PATENT NO. : 5,156,679
DATED : October 20, 1992
INVENTOR(S) : Ellis M. Gartner and David Francis Myers It is certified that error appears in the above-indentified patent and that said Letters Patent is hereby corrected as shown below:

In Column 8, at line 52, delete "$R_2$ represents a $C_2$-$C_8$ alkyl group" and insert --$R_2$ represent a $C_2$-$C_5$ hydroxyalkyl group;--

Signed and Sealed this

Thirty-first Day of May, 1994

Attest:

BRUCE LEHMAN

*Attesting Officer*        *Commissioner of Patents and Trademarks*